United States Patent [19]

Noguchi

[11] Patent Number: 5,221,077

[45] Date of Patent: Jun. 22, 1993

[54] VIBRATION ISOLATING APPARATUS

[75] Inventor: Takeshi Noguchi, Yokohama, Japan

[73] Assignees: Bridgestone Corporation, Tokyo; Toyota Jidosha Kabushiki Kaisha, Toyota, both of Japan

[21] Appl. No.: 773,799

[22] Filed: Oct. 9, 1991

Related U.S. Application Data

[62] Division of Ser. No. 515,570, Apr. 27, 1990, Pat. No. 5,076,532.

[30] Foreign Application Priority Data

May 15, 1989 [JP] Japan .................. 1-120861

[51] Int. Cl.$^5$ .............................................. F16M 5/00
[52] U.S. Cl. ........................... 267/140.12; 267/141.1
[58] Field of Search ............. 267/140.1, 140.3, 140.4, 267/141.1, 141.2, 141.3; 248/565, 636

[56] References Cited

U.S. PATENT DOCUMENTS

| | | | |
|---|---|---|---|
| 4,705,410 | 11/1987 | von Broock | 267/140.1 C X |
| 4,728,086 | 3/1988 | Ishiyama et al. | 267/140.1 C |
| 4,790,520 | 12/1988 | Tanaka . | |
| 4,840,359 | 6/1989 | Hamaekers . | |
| 4,865,299 | 9/1989 | Goto | 267/140.1 C |
| 4,869,475 | 9/1989 | Bouhier | 267/140.1 C |
| 4,893,799 | 1/1990 | de Fontenay | 267/140.1 C |
| 4,896,868 | 1/1990 | Thelamon et al. | 267/140.1 C |
| 4,909,489 | 3/1990 | Doi . | |
| 4,919,400 | 4/1990 | Tabata et al. | 267/140.1 C |
| 4,944,482 | 7/1990 | Bouhier . | |

FOREIGN PATENT DOCUMENTS

| | | | |
|---|---|---|---|
| 326504 | 8/1989 | European Pat. Off. . | |
| 3721444 | 1/1988 | Fed. Rep. of Germany . | |
| 60-18342 | 2/1985 | Japan . | |
| 60-75737 | 5/1985 | Japan . | |
| 144444 | 7/1986 | Japan . | |
| 88834 | 4/1987 | Japan . | |
| 214531 | 4/1988 | Japan | 248/562 |
| 63-106934 | 7/1988 | Japan . | |
| 98718 | 4/1989 | Japan . | |
| 116329 | 5/1989 | Japan | 267/140.1 C |

Primary Examiner—Robert J. Oberleitner
Assistant Examiner—Lee W. Young
Attorney, Agent, or Firm—Oliff & Berridge

[57] ABSTRACT

A vibration isolating apparatus disposed between a vibration generating unit and a vibration receiving unit has an elastic member which is engaged between an inner tube and an outer tube disposed outside the inner tube in parallel relation for coupling both of the tubes, and which is formed with a thin-wall bending portion. Accordingly, when a load acts on the inner tube and/or the outer tube, the thin-wall bending portion is deformed so as to prevent the elastic member from deforming abnormally.

11 Claims, 13 Drawing Sheets

F I G. 11
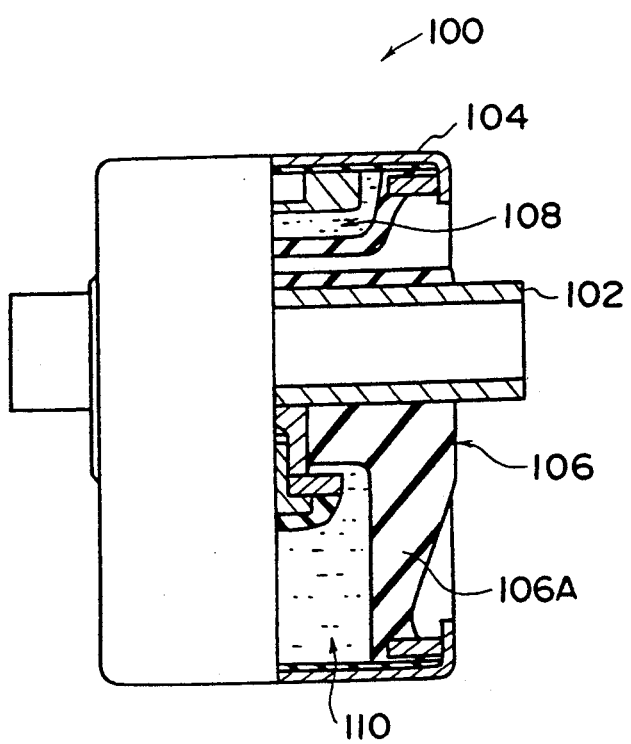

F I G. 13
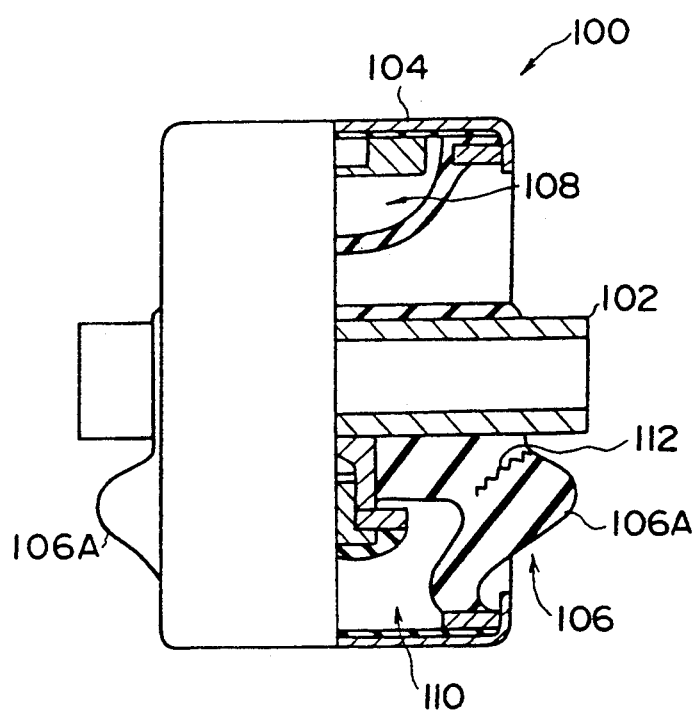

VIBRATION ISOLATING APPARATUS

This is a division of application Ser. No. 07/515,570 filed Apr. 27, 1990, now U.S. Pat. No. 5,076,532.

BACKGROUND OF THE INVENTION

1. Field of the Invention

The present invention relates to a vibration isolating apparatus which is used on an engine mount, body mount, cab mount and the like for absorbing vibration.

2. Description of Prior Art

A vibration isolating apparatus having the structure of an elastic member engaged or bridged between an inner tube and an outer tube has been used on an engine mount, body mount, cab mount and the like of an automobile.

One type of vibration isolating apparatus 100 is structured, as shown in FIGS. 11 and 12, such that a rubber body 106 is disposed between and vulcanized to an inner tube 102 and an outer tube 104 thereby defining an auxiliary liquid chamber 108 and a main liquid chamber 110 on the opposite sides of the inner tube 102.

With such a vibration isolating apparatus 100, however, when the inner tube 102 is greatly moved downwardly (as viewed in FIGS. 11 and 12) upon a large load acting on the inner tube 102, a leg 106A of the rubber body 106 which constitutes a side wall of the main liquid chamber 110 is compressed due to the large load.

Therefore, as shown in FIG. 13, the leg 106A is deformed to a large extent by bending outwardly in the axial direction of the vibration isolating apparatus 100. This results in a disadvantage that a crack 112 develops in the leg 106A of the rubber body 106 and durability of the vibration isolating apparatus 100 is hence deteriorated.

SUMMARY OF THE INVENTION

In view of the above disadvantage in the prior art, an object of the present invention is to provide a vibration isolating apparatus which prevents an elastic member from deforming greatly and abnormally, and which is superior in durability.

The vibration isolating apparatus comprises an inner tube supported to either one of a vibration generating unit and a vibration receiving unit, an outer tube is disposed outside the inner tube in coaxial relation therewith and supported to the other of the vibration generating unit and the vibration receiving unit, an elastic member is engaged between the inner tube and the outer tube for absorbing vibration transmitted to the inner tube and the outer tube, and a thin-wall bending portion for absorbing load that is subjected to the elastic member.

With the present invention thus arranged, when a large load acts on the inner tube under a condition that the vibration isolating apparatus is attached to a mount body, the elastic member engaged between the inner tube and the outer tube is compressed. However the resulting compression force is absorbed by the thin-wall bending portion. With the absorption of the compression force by the thin-wall bending portion, the elastic member is prevented from bending or folding abnormally. As a result, no cracks will be developed in the elastic member and durability of the vibration isolating apparatus can be improved.

BRIEF DESCRIPTION OF THE DRAWINGS

FIGS. 1 through 5 show a first embodiment of a vibration isolating apparatus according to the present invention in which:

FIG. 1 is a sectional view taken along a line I—I in FIG. 2,

FIG. 2 is a left-hand side view of the vibration isolating apparatus with the right-hand half sectioned, FIG. 3 is a perspective view of an intermediate tube, an outer tube and an orifice member, FIG. 4 is a view for explaining the operation, and FIG. 5 is a view corresponding to FIG. 2, for explaining the operation;

FIGS. 6 and 7 illustrate a second embodiment of the vibration isolating apparatus according to the present invention in which:

FIG. 6 is a front view of the vibration isolating apparatus with the right-hand half sectioned, and FIG. 7 is a left-hand side view of the vibration isolating apparatus;

FIGS. 9 and 10 illustrate a fourth embodiment of the vibration isolating apparatus according to the present invention in which:

FIG. 9 is a sectional view taken along a line IX—IX in FIG. 10, and

FIG. 10 is a sectional view taken along a line X—X in FIG. 9; and

FIGS. 11 through 13 illustrate a conventional vibration isolating apparatus in which:

FIG. 11 is a front view of the conventional vibration isolating apparatus with the right-hand half sectioned, FIG. 12 is a left-hand side view of the conventional vibration isolating apparatus with the right-hand half sectioned, and FIG. 13 is a view corresponding to FIG. 4, for explaining the operation.

DETAILED DESCRIPTION OF PREFERRED EMBODIMENTS

First Embodiment

FIGS. 1 through 5 illustrate a first embodiment of a vibration isolating apparatus 10 according to the present invention.

Figure 1:
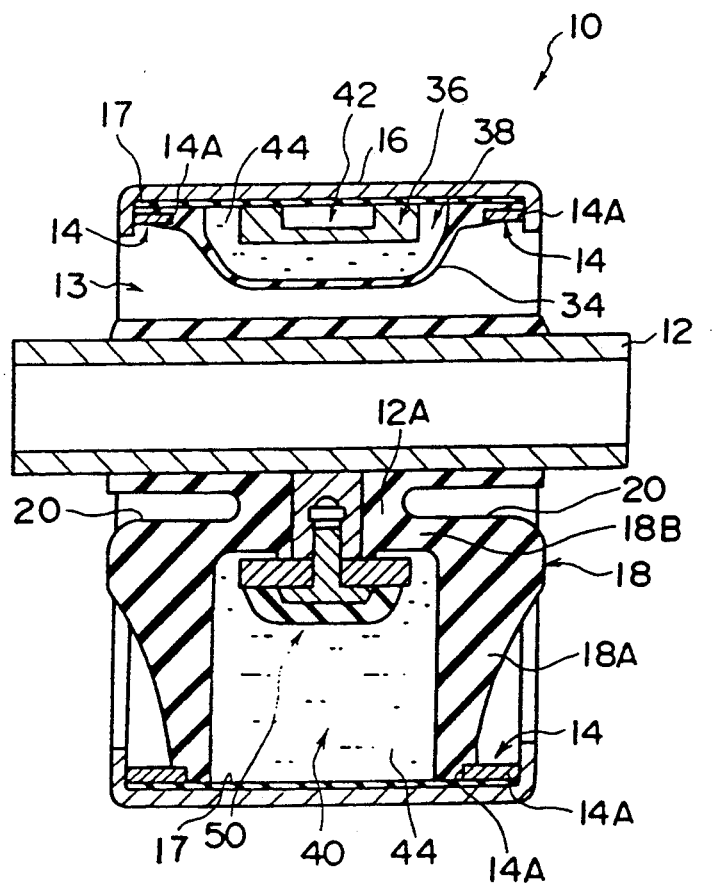

As shown in FIG. 1, an inner tube 12 in the form of a cylinder is provided at the axial center of the vibration isolating apparatus 10, while an intermediate tube 14 and an outer tube 16 are disposed outside the inner tube 12 with their axes substantially parallel to the inner tube 12. A sealing rubber 17 is disposed between the intermediate tube 14 and the outer tube 16 in such a manner as to abut the inner peripheral surface of the outer tube 16. The sealing rubber 17 is stuck by vulcanization to the inner peripheral surface of the outer tube 16. The opposite end portions of the outer tube 16 are bent inwardly in the radial direction to abut against the opposite end faces of the intermediate tube 14, respectively, so that the intermediate tube 14 is prevented from slipping off the inner portion of the outer tube 16.

A rubber body 18 functioning as an elastic member is disposed between the outer peripheral surface of the inner tube 12 and an inner peripheral surface of the intermediate tube 14. The rubber body 18 is stuck by vulcanization to both the inner tube 12 and the intermediate tube 14. Thus, with the intermediate tube 14 fixed by caulking to the outer tube 16, the rubber body 18 is engaged or bridged between the inner tube 12 and the outer tube 16 through the intermediate tube 14.

Figure 3:
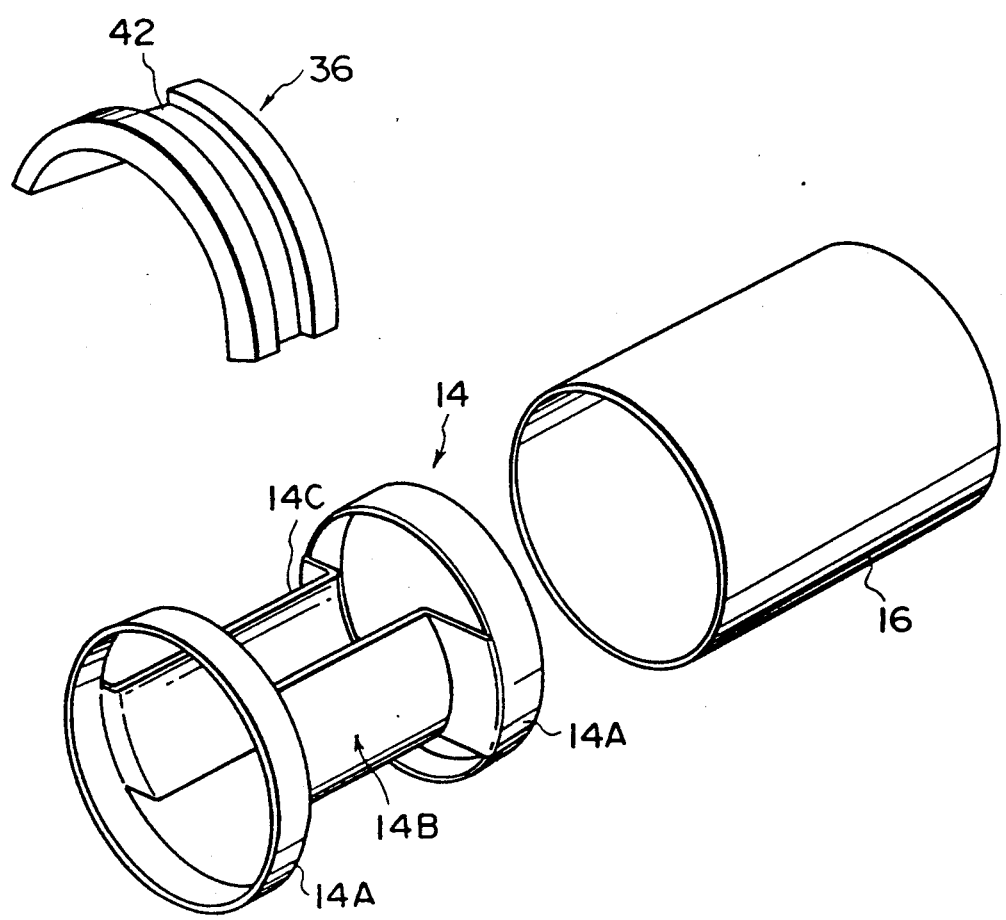

As shown in FIG. 3, the intermediate tube 14 has larger-diameter portions 14A formed respectively at its axially opposite ends and in its axially middle region with a smaller-diameter portion 14B. A cut-out 14C in the form of a substantially rectangular shape as viewed from above is formed in each of the upper and lower sides (the vertically opposite sides in FIG. 3) of the smaller-diameter portion 14B.

Figure 2:
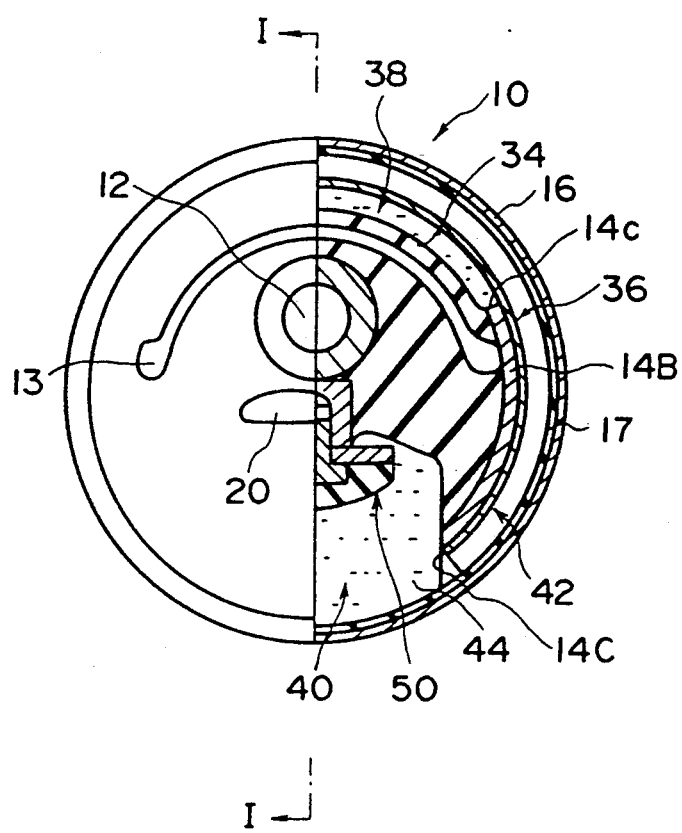

As shown in FIGS. 1 and 2, the rubber body 18 has recesses formed in its opposite parts extending from the outer periphery thereof toward the inner tube 12. A liquid 44 is filled in these recesses to define an auxiliary liquid chamber 38 on the upper side (as viewed in FIGS. 1 and 2) of the inner tube 12, and a main liquid chamber 40 on the lower side (as viewed in FIGS. 1 and 2) of the inner tube 12.

As shown in FIG. 1, opposite side walls of the main liquid chamber 40 in the axial direction of the vibration isolating apparatus 10 are respectively constituted by a pair of legs 18A of the rubber body 18. These legs 18A serve to support the load acting on the inner tube and are hence formed to be relatively thick.

As shown in FIGS. 1 and 2, recesses 20 are formed in the pair of legs 18A at positions, namely shoulder portions of the legs 18 near and just below the inner tube 12, thereby forming a pair of thin-wall bending portions 18B.

As shown in FIG. 1, the recesses 20 are each formed into a substantially U-shaped in section extending from the outer side toward the inner side in the axial direction of the vibration isolating apparatus 10. The bottom of the recess 20 reaches up to a position above the main liquid chamber 40 in such a manner that the leg 18A is connected via the thin-wall bending portion 18B to a thick-wall portion 12A near the inner tube 12. Further, as shown in FIG. 2, the recess 20 has an elliptic-shape opening (only half thereof being shown in FIG. 2) which is elongate in the traverse direction (in the right and left direction in FIG. 2).

Between the auxiliary liquid chamber 38 and the inner tube 12, as shown in FIG. 1, there is defined a cavity (hollow portion) 13 extending in the axial direction of the inner tube 12. In other words, the rubber body 18 is then in its part between the cavity 13 and the auxiliary liquid chamber 38 so as to form a diaphragm rubber 34 which constitutes a partition for the auxiliary liquid chamber 38. Elastic deformation of the diaphragm 34 allows the auxiliary liquid chamber 38 to expand and contract. In addition, the diaphragm rubber 34 bulges toward the inner tube 12 through the cut-out 14C of the intermediate tube 14.

As shown in FIG. 3, an orifice member 36 is formed to be disposed around the smaller-diameter portion 14B of the intermediate tube 14. The orifice member 36 has an arcuate shape which is concaved downwardly (toward the lower side in FIG. 3). A groove is circumferentially formed in the outer peripheral surface of the orifice member 36, and serves as an orifice 42. Further, as shown in FIG. 1, the outer peripheral surface of the orifice member 36 is brought into liquid-tight abutment with the sealing rubber 17. The orifice 42 is communicated at one end in the direction of length thereof with the auxiliary liquid chamber 38 and at the other end with the main liquid chamber 40, whereby the auxiliary liquid chamber 38 and the main liquid chamber 40, are interconnected to each other via the orifice 42.

As shown in FIGS. 1 and 2, a vibration absorbing mechanism 50 projects into the main liquid chamber 40. When the orifice 42 clogs under high-frequency vibrations, the mechanism 50 can produce liquid pillar resonance to absorb such high-frequency vibrations.

The operation of the first embodiment will now be described.

In this embodiment, the inner tube 12 is coupled to an engine (not shown) of an automobile, while the outer tube 16 is coupled to a chassis (not shown) of the automobile. With the vibration isolating apparatus 10 mounted on an automobile, the inner tube 12 is moved downwardly (toward the lower side in FIGS. 4 and 5) by virtue of the dead load of the engine.

Engine vibration produced during traveling of the automobile is transmitted to the rubber body 18 via the inner tube 12. However, it is attenuated through the internal friction of the rubber body 18. Simultaneously, since the auxiliary liquid chamber 38 and the main liquid chamber 40 are both subjected to a compression force upon the vibration of the engine, the vibration is also absorbed through resistance developed when the liquid 44 passes through the orifice 42.

Figure 4:
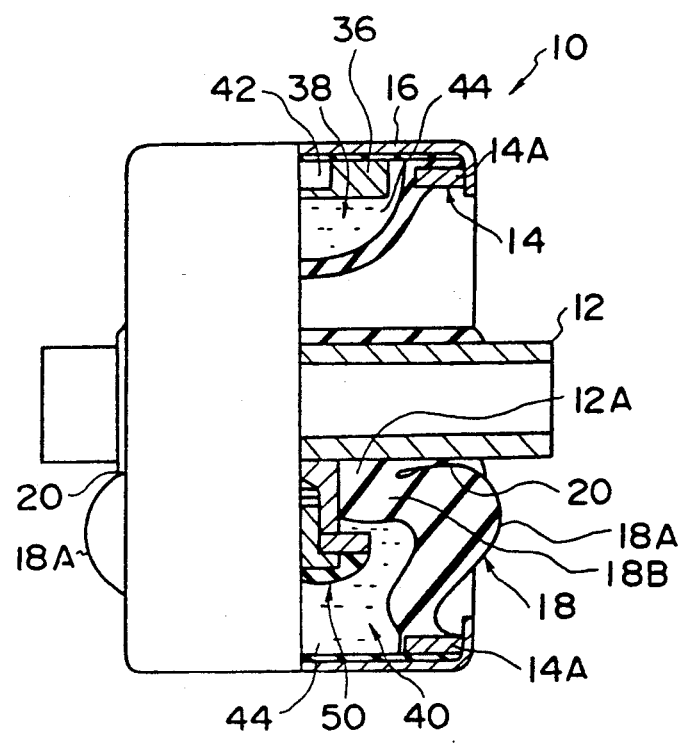
Figure 5:
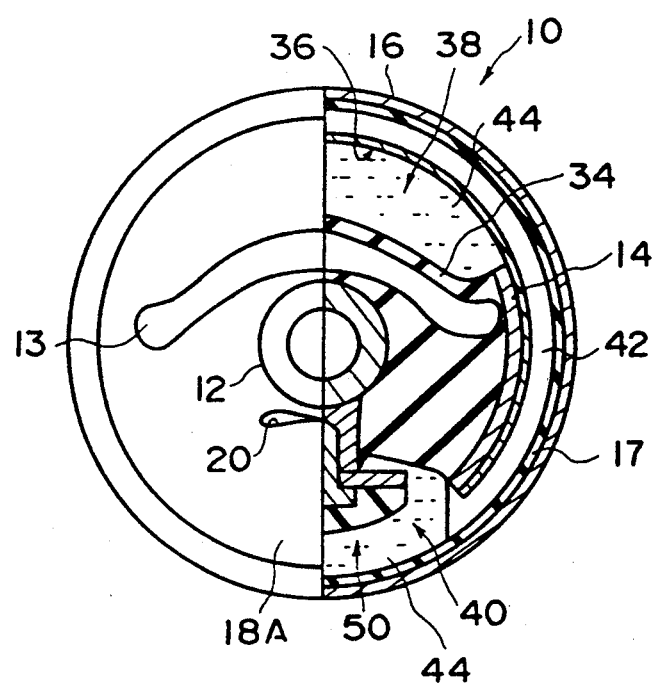

In the foregoing vibration isolating apparatus 10, when the inner tube 12 is subjected to a large load, the legs 18A receive a compression force in the radial direction (in the vertical direction in FIGS. 4 and 5) and the inner tube 12 is hence moved to a large extent downwardly (toward the lower side in the FIGS. 4 and 5). Because of the recesses 20 formed in the legs 18A at positions near the inner tube, the legs 18A deform at their thin-wall bending portions 18B and the recesses 20 collapse, as shown in FIG. 4, upon receiving a large load.

Accordingly, the legs 18A are prevented from bending or folding abnormally. This prevents cracks from occurring in the legs 18A and improves durability of the vibration isolating apparatus 10.

Second Embodiment

Figure 6:
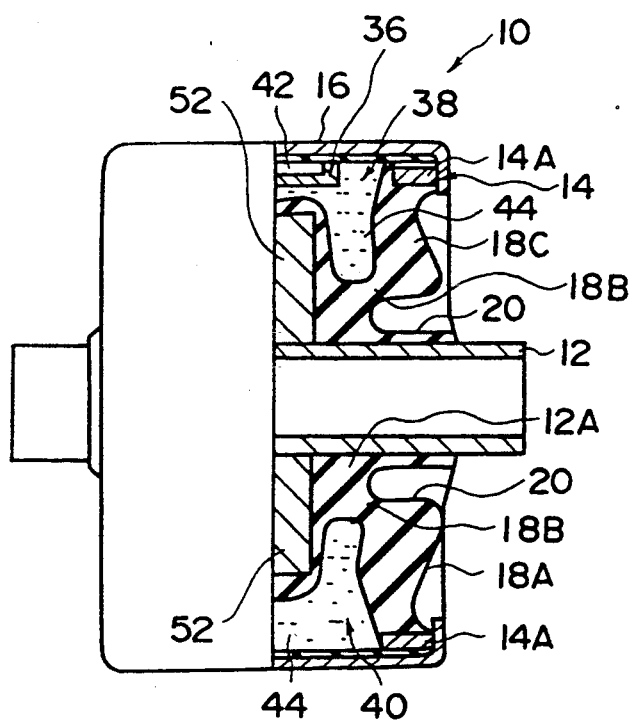
Figure 7:
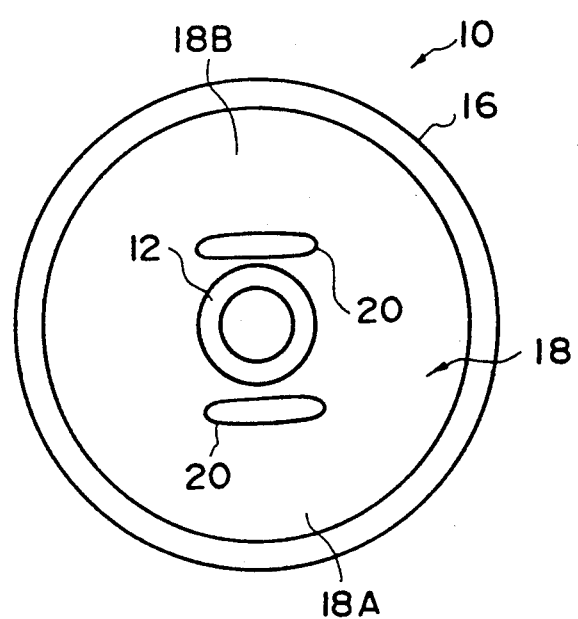

FIGS. 6 and 7 illustrate a second embodiment of the vibration isolating apparatus 10 according to the present invention.

In the vibration isolating apparatus 10 of this embodiment, as shown in FIG. 6, legs 18C are also formed above the inner tube 12 (on the upper side in FIG. 6), in addition to legs 18A formed below the inner 12 (on the lower side in FIG. 6). The legs 18C respectively constitute side walls of the auxiliary liquid chamber 38 defined above the inner tube 12. A stopper 52 is provided around a central portion of the inner tube 12 of the vibration isolating apparatus 10.

As shown in FIGS. 6 and 7, recesses 20 are formed not only in the legs 18A, but also in the legs 18C, thereby providing thin-wall bending portions 18B in the legs 18C as well. The recesses 20 formed in the legs 18C also have a substantially U-shape in section as with the recesses 20 formed in the legs 18A.

In this embodiment, therefore, when the inner tube 12 is moved upwardly upon receiving a large load, or when the outer tube 16 is moved downwardly to compress the legs 18C in the radial direction, the recesses 20 formed in the legs 18C collapse so as to prevent the legs 18C from bending or folding abnormally. This makes it possible to prevent the occurrence of cracks in the legs 18C and improve durability of the vibration isolating apparatus 10.

Third Embodiment

Figure 8:
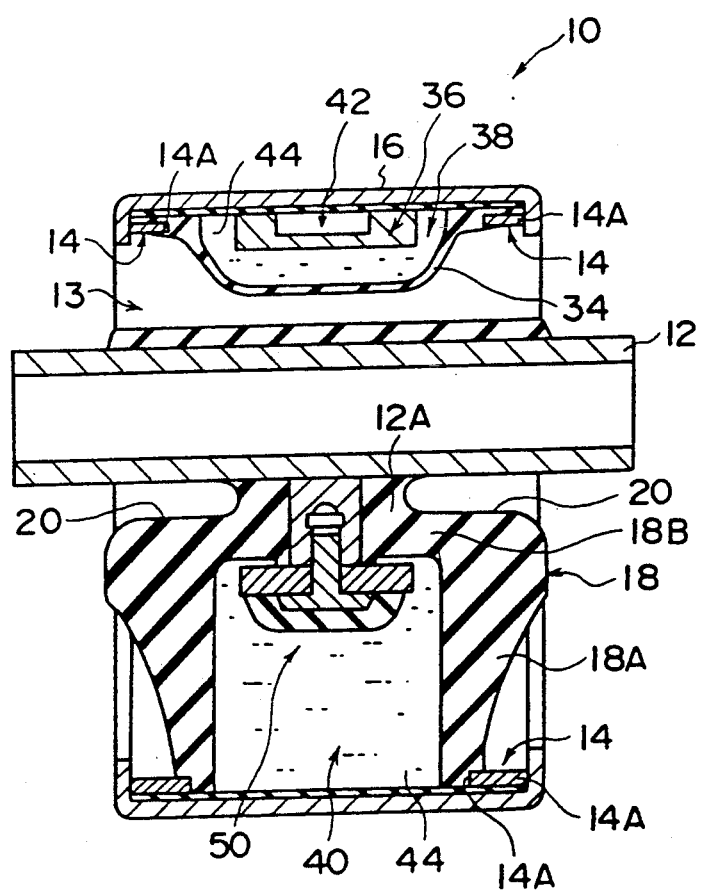
FIG. 8 is a sectional view corresponding to FIG. 1, illustrating a third embodiment of the vibration isolating apparatus according to the present invention.

FIG. 8 illustrates a third embodiment of the vibration isolating apparatus 10 according to the present invention.

In this embodiment, as shown in FIG. 8, recesses 20 are each formed at a position, right below the inner tube 12, where the leg 18A is brought into abutment with the inner tube 12. Thus, in this embodiment, the rubber body 18 is not stuck by vulcanization to the outer peripheral surface of the inner tube 12 in its regions right above the recesses 20. The vibration isolating apparatus of the third embodiment is different from that of the first embodiment in the above point. The recesses 20 are formed into a substantially U-shape in section defined by the inner tube 12 and the legs 18A.

In this embodiment too, when the inner tube 12 is moved upwardly upon receiving a large load to compress the legs 18A in the radial direction, the recesses 20 collapse so as to prevent the legs 18A from bending or folding abnormally.

As a result, it is possible to prevent the occurrence of cracks in the legs 18A and improve durability of the vibration isolating apparatus 10.

Fourth Embodiment

Figure 9:
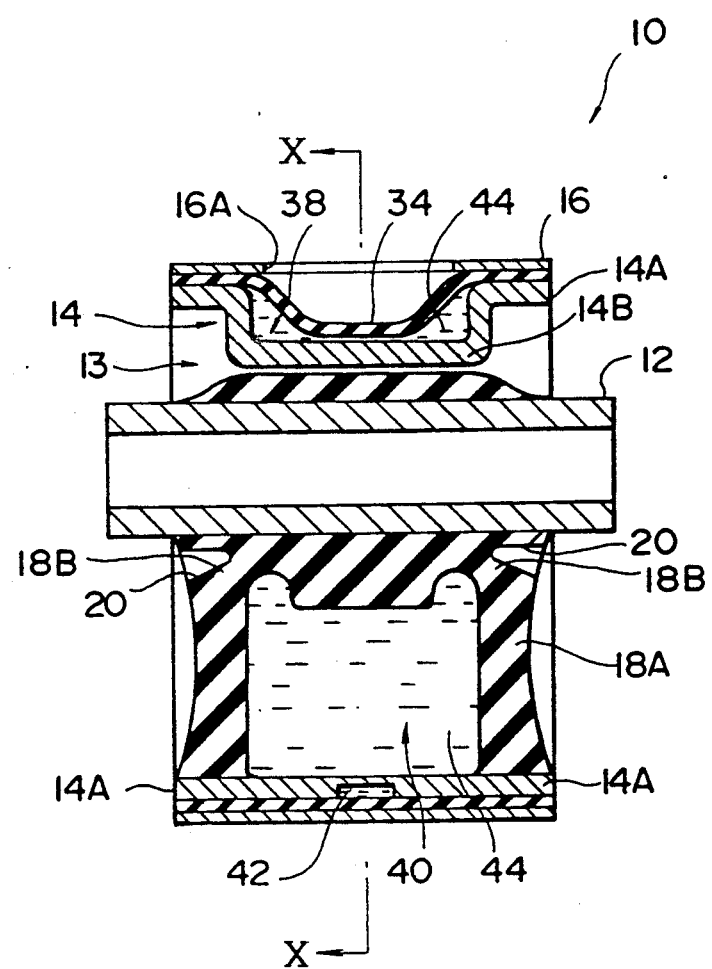
Figure 10:
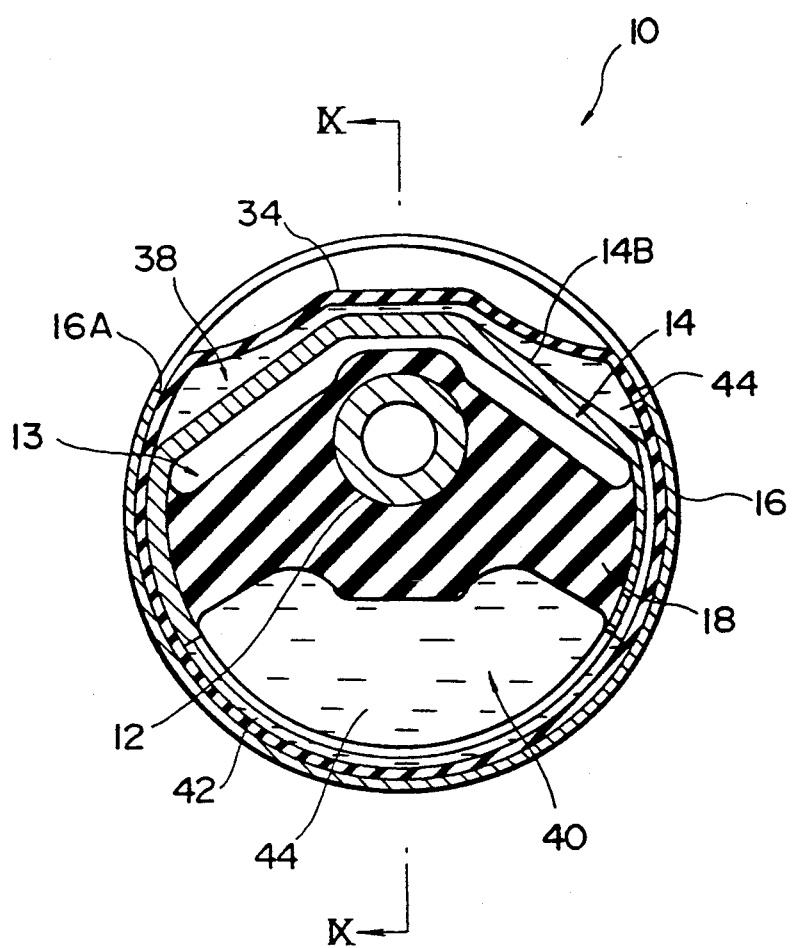
Figure 12:
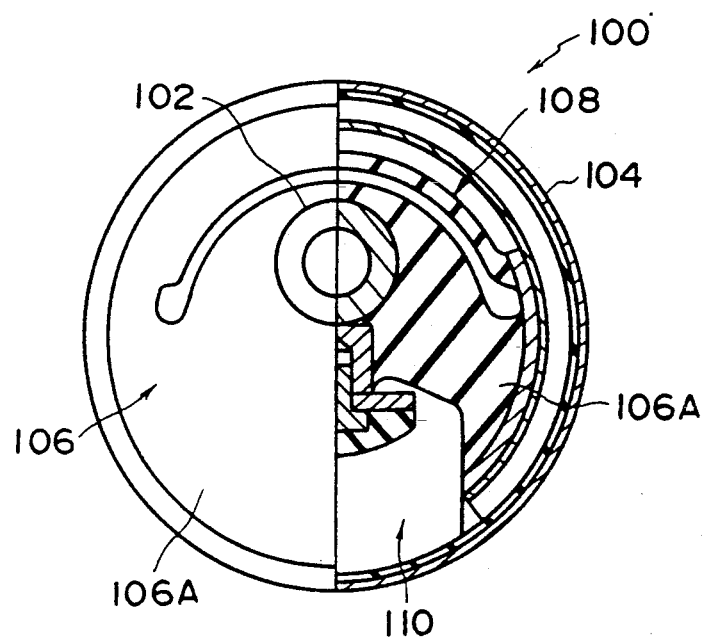

FIGS. 9 and 10 illustrate a fourth embodiment of the vibration isolating apparatus 10 according to the present invention.

In this embodiment, as shown in FIG. 9, the cut-out 14C provided in the first embodiment (see FIG. 3) is not formed in the upper side (as viewed in FIG. 9) of the smaller-diameter portion 14B of the intermediate tube 14. The auxiliary liquid chamber 38 is defined by the diaphragm rubber 34 and the smaller-diameter portion 14B of the intermediate tube 14.

Furthermore, as shown in FIGS. 9 and 10, a cut-out 16A is formed in a part of the outer tube 16 which corresponds to the diaphragm rubber 34, allowing the diaphragm rubber 34 to easily expand and contract.

As shown in FIG. 9, the recesses 20 in this embodiment are each formed into a substantially wedge-like shape and are shallower in depth than the recesses 20 in the above first through third embodiments. However, because thin-wall bending portions 18B are similarly formed in the legs 18A, the legs 18A will not bend or fold abnormally even upon the inner tube 12 receiving a large load.

As a result, it is possible to prevent the occurrence of cracks in the legs 18A and improve durability of the vibration isolating apparatus 10.

Although the pit-like recesses 20 are formed to extend from the outer side toward the inner side in the axial direction of the vibration isolating apparatus 10 in the first through fourth embodiments, the present invention is not limited to that arrangement. Alternatively, pit-like recesses 20 may be formed to extend from the inner side toward the outer side in the axial direction of the vibration isolating apparatus 10, thereby providing thin-wall bending portions 18B in the legs 18A.

Moreover, although the thin-wall bending portions 18B are formed in the vicinity of the inner tube 12 in the first through fourth embodiments, the present invention is also not limited to that arrangement. As an alternative example, the thin-wall bending portions 18B may be formed in the legs 18A at positions near the outer tube 16.

According to the present invention, as described above, since a thin-wall bending portion is formed in an vibration isolating apparatus provided with an elastic member which is engaged or bridged between an inner tube and an outer tube for absorbing vibration transmitted to the inner tube and the outer tube, the thin-wall bending portion can absorb a large load whenever the large load acts on the elastic member, resulting in the advantageous effect of preventing the occurrence of cracks in the elastic member and improving durability of the vibration isolating apparatus.

What is claimed is:

1. A vibration isolating apparatus comprising:

an inner tube supported to either one of a vibration generating unit and a vibration receiving unit;

an outer tube disposed outside said inner tube, an axis of said outer tube being substantially parallel to an axis of said inner tube, and said outer tube supported to the other of said vibration generating unit and said vibration receiving unit;

an intermediate tube having larger diameter portions formed at respective opposite ends and a smaller diameter portion between said larger diameter portions, said intermediate tube disposed between said inner tube and said outer tube;

a first elastic member bridged between said inner tube and said intermediate tube for absorbing vibrations transmitted to one of said inner tube and said outer tube from the other;

a second elastic member provided between said outer tube and said intermediate tube for supporting said intermediate tube on said outer tube, having a diaphragm portion in the vicinity of said smaller diameter portion of said intermediate tube, said diaphragm portion being free from said intermediate and outer tubes;

a main liquid chamber filled with liquid, provided between said inner tube and said intermediate tube, and defined in part by walls of said first elastic member to be capable of expanding and contracting upon deformation of said first elastic member due to a load and vibrations;

an auxiliary liquid chamber communicated through an orifice with said main liquid chamber and filled with liquid, said auxiliary liquid chamber provided outside said smaller diameter portion of said intermediate tube, and defined in part by walls of said diaphragm portion of said second elastic member to be capable of expanding and contracting upon deformation of said diaphragm portion of said second elastic member due to a load and vibrations, said auxiliary liquid chamber being provided on the opposite side of said inner tube to said main liquid chamber;

a cavity parallel to the axial direction of said inner tube, provided on the opposite side of said inner tube to said main liquid chamber and adjacent to said intermediate tube, and said first elastic member able to deform in said cavity to cause a flow of liquid between said main and auxiliary liquid chambers through said orifice;

at least one recess extending parallel to the axial direction of said inner tube, provided in said first elastic member on the opposite side of said inner tube from said cavity; and a thin-wall bending portion provided in said first elastic member for absorbing a load that is subjected to said first elastic member.

2. A vibration isolating apparatus according to claim 1, wherein said thin-wall bending portion is formed by providing said recess in said first elastic member to extend inwardly in the axial direction of said inner tube.

3. A vibration isolating apparatus according to claim 1, wherein said recess has a substantially wedge-like shape in section.

4. A vibration isolating apparatus according to claim 1, wherein said intermediate tube has an arcuate shape concaved downward and a groove circumferentially formed in an outer peripheral surface thereof, said groove being operated as said orifice for the liquid.

5. A vibration isolating apparatus according to claim 1, wherein said thin-wall bending portion has a thickness less than the average thickness of walls of the first elastic member.

6. A vibration isolating apparatus according to claim 1, further comprising a space between said outer tube and said diaphragm portion of said second elastic member to allow said auxiliary liquid chamber to easily expand and contract into said space.

7. A vibration isolating apparatus according to claim 1, wherein said outer tube has a cut-out in the vicinity of said diaphragm portion of said second elastic member to allow said auxiliary liquid chamber to easily expand and contract to an open space.

8. A vibration isolating apparatus according to claim 1, wherein said second elastic member except for said diaphragm portion is connected to said outer tube.

9. A vibrating isolating apparatus according to claim 1, wherein at least a portion of said second elastic member is connected to said outer tube.

10. A vibration isolating apparatus according to claim 1, wherein said thin-wall bending portion is provided in the first elastic member near the inner tube.

11. A vibration isolating apparatus according to claim 1, wherein said thin-wall bending portion is provided in the first elastic member near and just below the inner tube.

* * * * *